United States Patent
Wang et al.

(10) Patent No.: US 9,755,412 B2
(45) Date of Patent: Sep. 5, 2017

(54) GROMMET FOR MOUNTING CABLE GLAND OR THE LIKE

(71) Applicant: CommScope Technologies LLC, Hickory, NC (US)

(72) Inventors: Chi-ming Wang, Chicago, IL (US); Ronald A. Vaccaro, Shorewood, IL (US)

(73) Assignee: CommScope Technologies LLC, Hickory, NC (US)

( * ) Notice: Subject to any disclaimer, the term of this patent is extended or adjusted under 35 U.S.C. 154(b) by 0 days.

(21) Appl. No.: 15/013,636

(22) Filed: Feb. 2, 2016

(65) Prior Publication Data

US 2016/0247609 A1   Aug. 25, 2016

Related U.S. Application Data

(60) Provisional application No. 62/119,875, filed on Feb. 24, 2015.

(51) Int. Cl.
    *H02G 3/22* (2006.01)
(52) U.S. Cl.
    CPC ..................... *H02G 3/22* (2013.01)

(58) Field of Classification Search
    USPC ........................... 174/152 G, 153 G
    See application file for complete search history.

(56) References Cited

U.S. PATENT DOCUMENTS

| | | | | |
|---|---|---|---|---|
| 3,076,668 A * | 2/1963 | Famely | ........... | F16L 5/027 |
| | | | | 248/56 |
| 4,041,241 A * | 8/1977 | Olmstead | ........... | H01B 17/308 |
| | | | | 174/153 G |
| 4,626,620 A * | 12/1986 | Plyler | ........... | H02G 3/083 |
| | | | | 174/153 G |
| 5,052,699 A * | 10/1991 | Tucker | ........... | H02G 3/0675 |
| | | | | 16/2.2 |
| 8,367,944 B2 * | 2/2013 | Chiou | ........... | H02G 3/0691 |
| | | | | 174/480 |
| 2011/0010891 A1 * | 1/2011 | Rowley | ........... | A47H 5/03 |
| | | | | 16/2.1 |

* cited by examiner

*Primary Examiner* — Dhirubhai R Patel
(74) *Attorney, Agent, or Firm* — Myers Bigel, P.A.

(57) ABSTRACT

A grommet for mounting a cable within a cable gland includes: an annular body having first and second opposed ends along a longitudinal axis; and a flange extending radially outwardly from the first end of the body. The second end is tapered to encourage insertion into an open end of a cable gland. The flange and body are formed as a monolithic component includes an elastomeric material.

9 Claims, 2 Drawing Sheets

GROMMET FOR MOUNTING CABLE GLAND OR THE LIKE

RELATED APPLICATION

The present application claims the benefit of and priority from U.S. Provisional Patent Application No. 62/119,875, filed Feb. 24, 2015, the disclosure of which is hereby incorporated herein in its entirety.

FIELD OF THE INVENTION

The present invention relates generally to cables, and more particularly to the interconnection of cables with enclosures.

BACKGROUND

Grommets are often used to mount an elongate cable (designated at 20 in FIGS. 5A and 5B, typically a fiber optic, coaxial, twisted pair, power, or hybrid cable) within the internal bore of a cable gland 22 mounted in a wall of an enclosure 24. In this environment, a grommet is used to customize the sealing of the gland 22 and the cable 20. However, it can be difficult to insert the end of a typical grommet 10' into the gland 22 (as in FIG. 4), because (a) the outer diameter of the grommet 10' is the approximate size of the gland opening and (b) the grommet 10' is typically formed of a pliable rubber that generates considerable friction when in contact with the gland 22. As such, insertion of the grommet 10' into the gland 22 often involves bending the grommet 10' to get one edge in initially, which can be particularly difficult for thicker grommets. As such, it may be desirable to address the difficulty of grommet installation.

SUMMARY

As a first aspect, embodiments of the invention are directed to a grommet for mounting a cable within a cable gland. The grommet comprises: an annular body having first and second opposed ends along a longitudinal axis; and a flange extending radially outwardly from the first end of the body. The second end is tapered to encourage insertion into an open end of a cable gland. The flange and body are formed as a monolithic component comprising an elastomeric material.

As a second aspect, embodiments of the invention are directed to an assembly, comprising: an elongate cable having an outer jacket; a cable gland having an internal bore; and a grommet having an annular body with first and second opposed ends along a longitudinal axis and a flange extending radially outwardly from the first end of the body, wherein the second end is tapered. The cable is inserted into the grommet, and the second end of the grommet is inserted into the cable gland.

As a third aspect, embodiments of the invention are directed to a grommet for mounting a cable within a cable gland, comprising: an annular body having first and second opposed ends along a longitudinal axis; and a flange extending radially outwardly from the first end of the body. The second end has an end surface, wherein the end surface has at least one recess. The flange and body are formed as a monolithic component comprising an elastomeric material.

DETAILED DESCRIPTION OF EMBODIMENTS OF THE INVENTION

Figure 1:
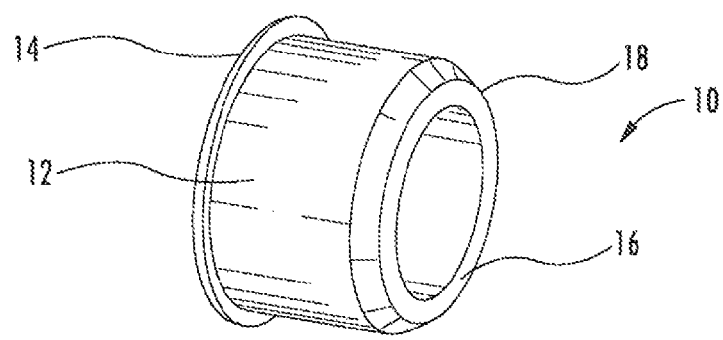
FIG. 1 is a rear perspective view of a grommet for use with a cable gland according to embodiments of the present invention.

The present invention now will be described more fully hereinafter with reference to the accompanying drawings, in which illustrative embodiments of the invention are shown. In the drawings, the relative sizes of regions or features may be exaggerated for clarity. This invention may, however, be embodied in many different forms and should not be construed as limited to the embodiments set forth herein; rather, these embodiments are provided so that this disclosure will be thorough and complete, and will fully convey the scope of the invention to those skilled in the art.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of this specification and the relevant art and will not be interpreted in an idealized or overly formal sense unless expressly so defined herein.

It will be understood that, although the terms first, second, etc. may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the present invention. Like numbers refer to like elements throughout the description.

Spatially relative terms, such as "beneath", "below", "lower", "above", "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90° or at other orientations) and the spatially relative descriptors used herein interpreted accordingly.

As used herein, the singular forms "a", "an" and "the" are intended to include the plural forms as well, unless expressly stated otherwise. It will be further understood that the terms "includes," "comprises," "including" and/or "comprising,"

when used in this specification, specify the presence of stated features, integers, steps, operations, elements, and/or components, but do not preclude the presence or addition of one or more other features, integers, steps, operations, elements, components, and/or groups thereof. It will be understood that when an element is referred to as being "connected" or "coupled" to another element, it can be directly connected or coupled to the other element or intervening elements may be present. As used herein, the term "and/or" includes any and all combinations of one or more of the associated listed items.

Figure 2:
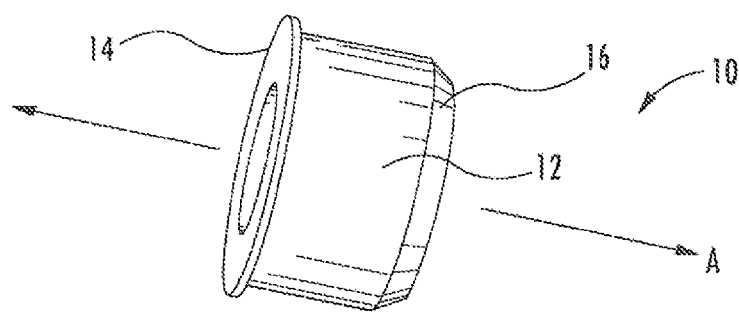
FIG. 2 is a front perspective view of the grommet of FIG. 1.

Referring now to FIGS. 1 and 2, a grommet, designated broadly at 10, is illustrated therein. The grommet 10 includes an annular body 12 with a circular flange 14 that extends radially outwardly from one end. The body 12 has a tapered end 16 opposite the flange 14 with a flat end surface 18. The body defines a longitudinal axis A, with the end surface 18 being generally normal to the axis A. The length of the body 12 is typically between about 0.5 and 1.5 inches, the outer diameter of the body 12 is typically between about 20 and 60 mm, and the thickness of the body 12 is typically between about 2 and 22 mm.

The grommet 10 is typically formed of an elastomeric material. Exemplary materials include rubbers like Buna-N and EPDM. The grommet 10 is ordinarily formed as a monolithic component, and may be formed by injection molding.

Figure 4:
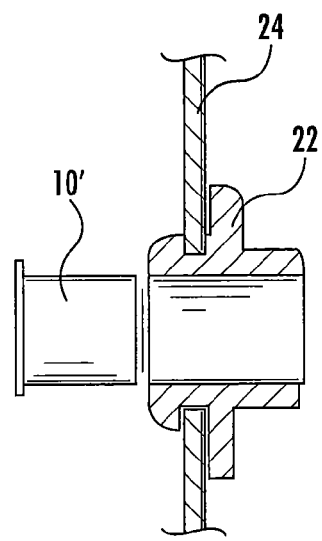
FIG. 4 is a partial section view of a prior art grommet prior to insertion into a cable gland and enclosure.
Figure 5A:
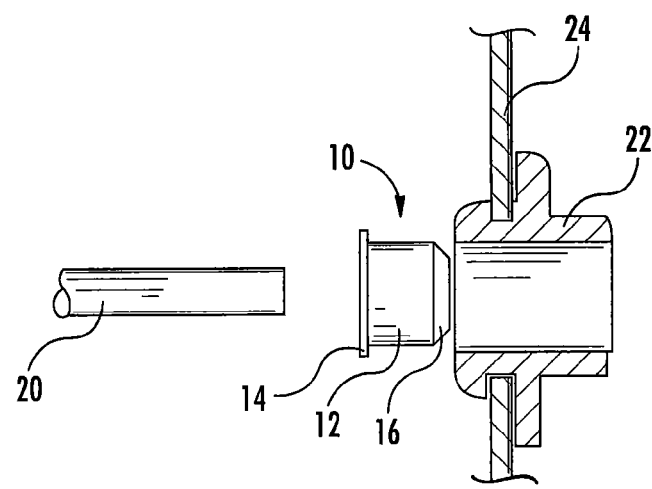
FIG. 5A is an exploded, partial section view of the grommet of FIG. 1 prior to insertion into a cable gland and enclosure.
Figure 5B:
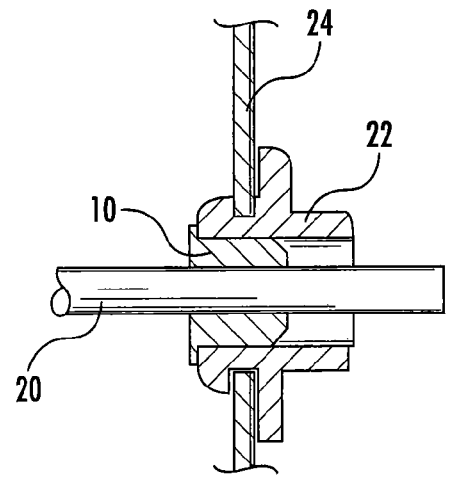
FIG. 5B is a partial section view of the grommet of FIG. 1 mounted in a cable gland that is in turn mounted in an enclosure, with a cable routed through the grommet.

One potential advantage of the grommet 10 can be seen in FIGS. 4, 5A and 5B. As discussed above, grommets are often used to mount an elongate cable 20 (typically a fiber optic, coaxial, twisted pair, power, or hybrid cable) in the internal bore of a cable gland 22 mounted in a wall of an enclosure 24. However, as is also discussed above, it can be difficult to insert the end of a prior art grommet 10' with straight side walls into the gland 22 (as in FIG. 4). As such, insertion of a grommet 10' with straight walls into the gland 22 often involves bending the grommet 10' to get one edge in initially, which can be particularly difficult for thicker grommets.

As shown in FIG. 5A, the tapered end 16 of the grommet 10 can help to align the grommet 10 for insertion into the gland 22. Once the end of the grommet 10 is inserted into the gland 22, the operator can push on the flange end of the grommet 10 with considerable force, which can overcome the friction between the grommet 10 and the gland 22. Once the grommet 10 is mounted in the gland 22 (FIG. 5B), the cable 20 can then be routed through the grommet 10 and gland 22 and into the enclosure 24.

Figure 3:
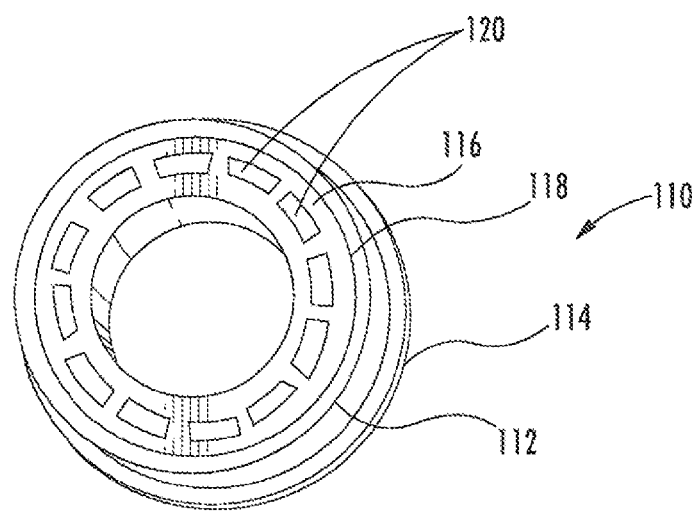
FIG. 3 is a rear perspective view of a grommet according to alternative embodiments of the invention.

Those skilled in this art will appreciate that other forms of the grommet may also be suitable for use with cable glands. Referring now to FIG. 3, a grommet 110 according to alternative embodiments of the invention is shown therein. The grommet 110 has a body 112, a flange 114 and a tapered end 116 similar to those of the grommet 10, but the end surface 118 of the tapered end of the grommet 110 includes a plurality of recesses 120. The recesses 120 can cause the tapered end 116 to collapse somewhat during insertion of the grommet 110 into a gland, which can assist in aligning and inserting the grommet 110. In some embodiments, the recesses 120 may be shaped differently, may be different in number, or may comprise a single groove around the tapered end 116. Other configurations will be apparent to those of skill in this art.

Those of skill in this art will appreciate that, although the grommets discussed herein are shown to be mounted onto an enclosure, other structures that receive a gland (a wall, a plate or panel, or the like) may also be desirable for use with the grommets and glands according to embodiments of the invention.

The foregoing is illustrative of the present invention and is not to be construed as limiting thereof. Although exemplary embodiments of this invention have been described, those skilled in the art will readily appreciate that many modifications are possible in the exemplary embodiments without materially departing from the novel teachings and advantages of this invention. Accordingly, all such modifications are intended to be included within the scope of this invention as defined in the claims. The invention is defined by the following claims, with equivalents of the claims to be included therein.

That which is claimed is:

1. A grommet for mounting a cable within a cable gland, comprising:
    an annular body having first and second opposed ends along a longitudinal axis; and a flange extending radially outwardly from the first end of the body;
    wherein the second end is tapered to encourage insertion into an open end of a cable gland; and wherein the flange and body are formed as a monolithic component comprising an elastomeric material;
    wherein the tapered end has an end surface that is normal to the longitudinal axis of the body; and wherein a plurality of recesses are present in the end surface of the tapered end, the recesses being configured to enable the tapered end to collapse upon insertion into the cable gland.

2. An assembly, comprising:
    an elongate cable having an outer jacket;
    a cable gland having an internal bore; and
    a grommet having an annular body with first and second opposed ends along a longitudinal axis and a flange extending radially outwardly from the first end of the body, wherein the second end is tapered;
    wherein the tapered end has an end surface that is normal to the longitudinal axis of the body;
    wherein at least one recess is present in the end surface of the tapered end;
    and wherein the cable is inserted into the grommet, and the second end of the grommet is inserted into the cable gland;
    wherein the at least one recess is configured to enable the tapered end to collapse upon insertion into the cable gland.

3. The assembly defined in claim 2, wherein the flange and body of the grommet are formed as a monolithic component comprising an elastomeric material.

4. The assembly defined in claim 2, wherein the at least one recess is a plurality of recesses.

5. The assembly defined in claim 2, further comprising an enclosure having an opening, wherein the cable gland is mounted into the opening.

6. The assembly defined in claim 5, wherein the flange and body of the grommet are formed as a monolithic component comprising an elastomeric material.

7. The assembly defined in claim 5, wherein the at least one recess is a plurality of recesses.

8. A grommet for mounting a cable within a cable gland, comprising:
    an annular body having first and second opposed ends along a longitudinal axis; and
    a flange extending radially outwardly from the first end of the body;

wherein the second end has an end surface, and wherein the end surface has at least one recess, wherein the at least one recess is configured to enable the tapered end to collapse upon insertion into a cable gland; and wherein the flange and body are formed as a monolithic component comprising an elastomeric material.

9. The grommet defined in claim 8, wherein the at least one recess is a plurality of recesses.

\* \* \* \* \*